(12) United States Patent
Low et al.

(10) Patent No.: US 8,401,531 B2
(45) Date of Patent: Mar. 19, 2013

(54) MESSAGING SERVICE SUBSCRIPTION

(75) Inventors: Sydney Gordon Low, Kew (AU);
Matthew Iain Walker, Heidelberg Heights (AU); Peter Yandell, Prahran (AU)

(73) Assignee: redtxt.com.au Pty Ltd., Kew (AU)

( * ) Notice: Subject to any disclaimer, the term of this patent is extended or adjusted under 35 U.S.C. 154(b) by 547 days.

(21) Appl. No.: 12/602,853

(22) PCT Filed: Jun. 4, 2008

(86) PCT No.: PCT/AU2008/000803
§ 371 (c)(1),
(2), (4) Date: Mar. 23, 2010

(87) PCT Pub. No.: WO2008/148157
PCT Pub. Date: Dec. 11, 2008

(65) Prior Publication Data
US 2010/0178904 A1 Jul. 15, 2010

(30) Foreign Application Priority Data
Jun. 4, 2007 (AU) .................................. 2007903014

(51) Int. Cl.
*H04M 3/42* (2006.01)
*H04L 29/06* (2006.01)
(52) U.S. Cl. ................... 455/415; 455/414.1; 455/414.3
(58) Field of Classification Search .................. None
See application file for complete search history.

(56) References Cited

U.S. PATENT DOCUMENTS

| | | | |
|---|---|---|---|
| 2004/0014454 A1 | 1/2004 | Burgess et al. | |
| 2004/0146145 A1 | 7/2004 | Kiser, Jr. et al. | |
| 2005/0004840 A1 | 1/2005 | Wanninger | |
| 2005/0069102 A1 | 3/2005 | Chang | |
| 2005/0076100 A1 | 4/2005 | Armstrong | |
| 2007/0173237 A1* | 7/2007 | Roundtree | 455/414.1 |
| 2008/0144783 A1* | 6/2008 | Kumar et al. | 379/88.13 |

FOREIGN PATENT DOCUMENTS

| | | |
|---|---|---|
| DE | 199 53 272 C1 | 5/2001 |
| EP | 0 851 696 A2 | 7/1998 |
| WO | WO 2005/060282 A1 | 6/2005 |

OTHER PUBLICATIONS

Extended Search Report dated Oct. 28, 2011 from European Patent Application No. 08756891.

* cited by examiner

*Primary Examiner* — Erika A Washington
(74) *Attorney, Agent, or Firm* — Wolf, Greenfield & Sacks, P.C.

(57) ABSTRACT

A messaging service system, including a call component for receiving a voice call from a caller and transmitting call data associated with the call, the call data including caller identification (ID) data; and a subscription server for receiving the call data, causing the call component to send a subscription acceptance message to the caller, and storing the caller ID data in association with data representing a messaging service identified by the called number of the call data.

20 Claims, 3 Drawing Sheets

MESSAGING SERVICE SUBSCRIPTION

FIELD

The present invention relates to a process and system for use in subscribing to a messaging service, such as an SMS delivery service.

BACKGROUND

A number of premium SMS (short message service) and MMS (multimedia messaging service) delivery services are available for mobile telephone subscribers. This allows subscribers to have selected messages delivered to their phones on a regular basis to provide information of interest, such as sports scores or breaking news. There are currently a number of different processes available for subscribing to the services, and these include:
  (i) Browsing to a website where a number of forms need to be completed and submitted to receive the service. This normally involves providing a range of different personal details.
  (ii) Sending an SMS message to a designated number. This may involve sending an SMS to a number advertised on television and/or in print media. The number may also be provided for responding to a particular competition, survey or voting process of a competition, such as part of a reality television program. Once the SMS is sent, then SMS messages may be delivered on a regular basis, and at significant cost to the subscriber for some premium SMS messages. Depending on the service, it can be difficult or cumbersome for a subscriber to unsubscribe.

Whilst the current processes may be relatively easy to use by people who are comfortable with new technology, there are a number of people who have considerable difficulty using the technology required to complete the processes. For example, there are a number of mobile telephone subscribers who find it extremely difficult to send SMS text messages, and also a number of mobile telephone subscribers who have never or do not know how to send an SMS message. Moreover, some mobile phone subscribers may not be able to access the Internet to complete the forms on web pages needed to subscribe to some SMS information services.

Accordingly, it is desired to provide a process and system which considerably simplify the subscription process or at least provide a useful alternative.

SUMMARY

In accordance with the present invention there is provided an automated process for subscription to a messaging service, including:
  accepting a voice call from a mobile communications device;
  extracting caller identification (ID) data received with the voice call;
  sending a subscription acceptance message to the device; and
  associating the caller ID data with a messaging service identified by the called number of the call.

The present invention also provides an automated process for subscription to a messaging service, including
  accepting a voice call from a communications device;
  determining if caller identification (ID) data can be extracted from the voice call;
  determining if the communications device is able to receive messages of a messaging service;
  sending a subscription acceptance message to the device; and
  associating the caller ID data with a messaging service identified by the called number of the call.

The present invention also provides a messaging service system, including:
  a call component for receiving a voice call from a caller and transmitting call data associated with the call, the call data including caller identification (ID) data; and
  a subscription server for receiving the call data, causing the call component to send a subscription acceptance message to the caller, and storing the caller ID data in association with data representing a messaging service identified by the called number of the call data

DESCRIPTION OF DRAWINGS

Preferred embodiments of the present invention are hereinafter described, by way of example only, with reference to the accompanying drawings, wherein.

DETAILED DESCRIPTION

Figure 1:
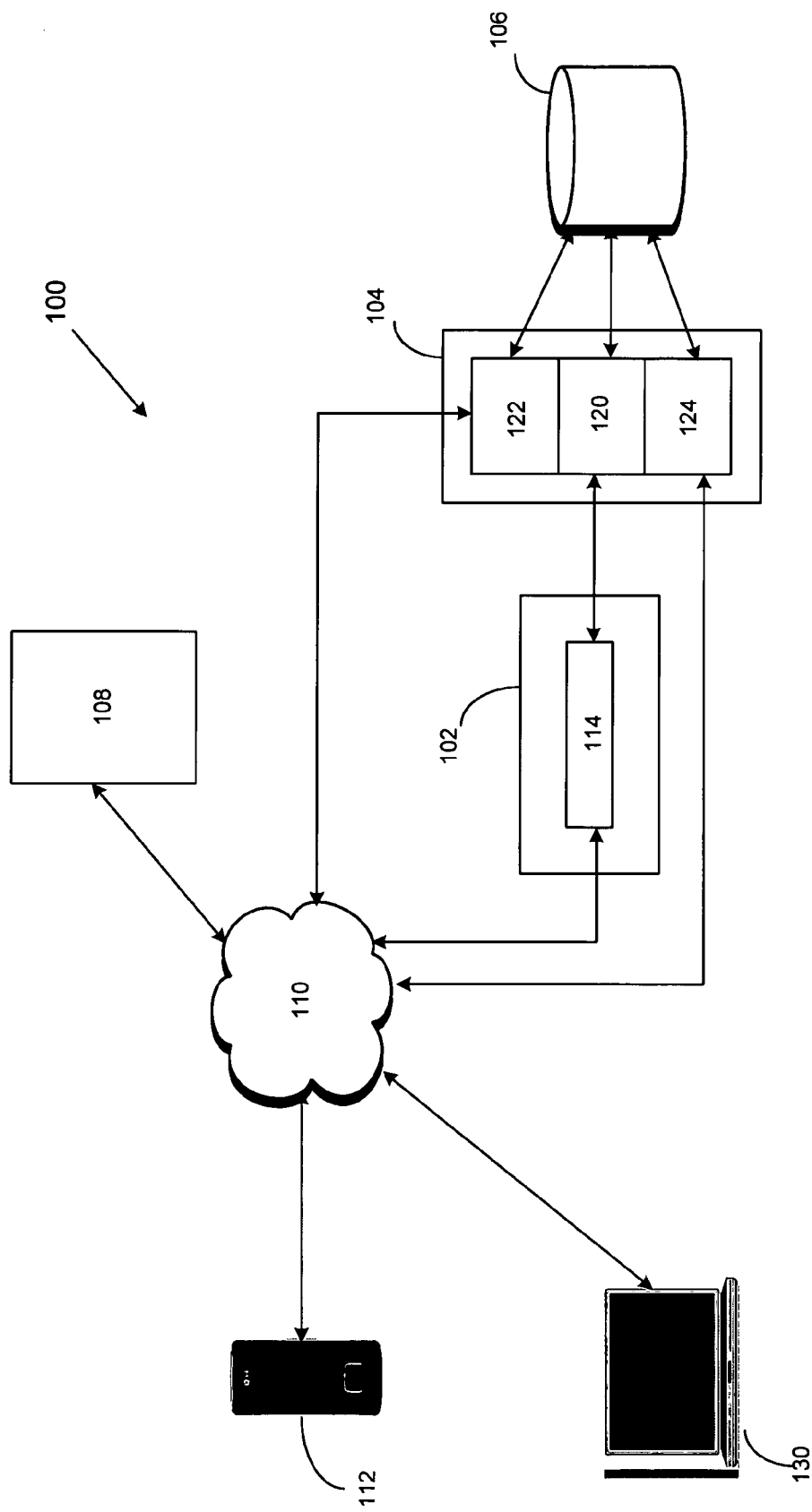
FIG. 1 is a block diagram of a preferred embodiment of a messaging service system.

A messaging service system 100, as shown in FIG. 1, includes a telephone private branch exchange (PBX) 102, at least one computer server 104, and a database 106 for maintaining subscription data for messaging services. The system 100 is connected to a public telecommunications network 110 that includes the Internet and the public switch telephone network (PSTN). The system 100 uses an SMS gateway 108, such as that provided by Clickatell (Pty) Ltd (http://www.clickatell.com), to send regular SMS or MMS messages to the mobile telephone 112 of a subscriber to a messaging service of the system 100.

Figure 3:
FIG. 3 is a screen shot of a display provided by the messaging service system.

The PBX 102 includes a call handling component 114 for accepting voice calls from the network 110 directed to one of a plurality of destination telephone numbers supported by the PBX 102. The call handling component 114 is able to receive a voice call and transmits call data associated with the call, such as the calling line identification and the called number, to a subscription server 120 of the server 104. The telephone numbers supported by the PBX 102 each correspond to a messaging service delivered by the system 100. Mobile telephone subscribers can be advised of numbers and the services they correspond to using a number of information delivery methods, including television and print advertisements. For example, the system 100 includes a web server 124 that provides a web site using data stored in the database 106, to provide information on the various messaging services supported by the system 100. A web page of the site delivered to a web browser of a computer 130 connected to the network 110 is shown in FIG. 3. This describes how to subscribe and unsubscribe to a number of messaging services that provide regular messages on respective topics, including dining deals, accommodation, travel bargains, movie specials, shopping offers and sport offers. To subscribe to a service, a mobile telephone subscriber simply needs to use their mobile telephone 112 to place a call, i.e. a voice call, to the telephone number corresponding to the service. The mobile telephone 112 can be any communications device that can place a voice call to the number of the service with calling line identification (CLI) enabled and which is capable of receiving SMS or MMS electronic messages.

Figure 2:
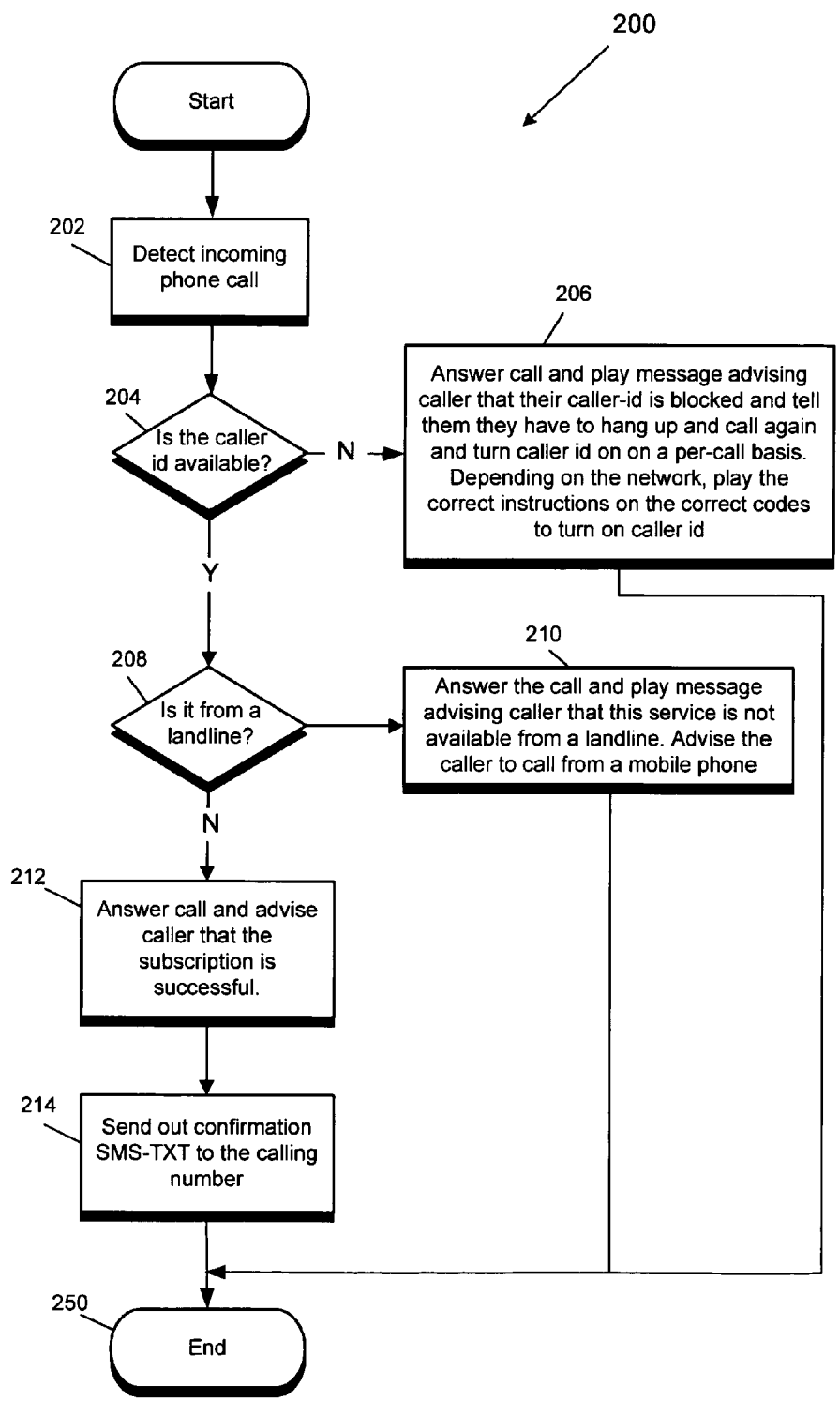
FIG. 2 is a flow diagram of a subscription process performed by the messaging service system.

The messaging service system 100 performs a subscription process 200 for a messaging service, as shown in FIG. 2. The subscription process and the other processes performed by the system 100 are entirely automated without any human intervention. The PBX 102 accepts a call from the mobile telephone 112 to the telephone number (e.g. 88221001) of a messaging service (e.g. for dining deals). The call is received by the call handling component 114 and the subscription server 120 detects the incoming phone call on receipt of the call data (step 202). The subscription server 120 processes the data of the call to first determine if caller identification (ID) data has been received with the call (204). The caller ID data is the calling line identification (CLI) data provided by the network 110 that represents the MSISDN (Mobile Station International Subscriber Directory Number) of the calling phone 112, i.e. the telephone number of the phone. If the caller identification data cannot be extracted, the subscription server 120 instructs the call handling component 114 to answer the call and access and play an audio file stored on the PBX 102. The played audio file advises the caller that the caller identification data cannot be obtained (206).

The audio message, depending on the call and how it is received, will also provide the caller with instructions on how to enable CLI so that the caller identification data may be extracted on a subsequent call. The call and the process is then terminated (250).

If the caller identification data can be extracted (204) the process 200 proceeds to determine whether the call has been received from a device that cannot receive the messages of the messaging service (208). For example, if the caller identification data extracted represents the telephone number of a fixed land line then this indicates that the messaging service cannot be delivered, and the subscription server 120 instructs the call handling component 114 to answer the call and play an appropriate stored audio message to the caller (210). The message may simply advise the caller that the service is not available from the particular telephone number on which the call has been made, and then advise the caller to call from a suitable mobile telephone. The call and the process is then terminated (250).

If it is determined that the telephone 112 can receive the messages of the messaging service (208), the subscription server 120 instructs the call handling component 114 to answer the call and play a stored audio file to advise the caller that subscription to the messaging service corresponding to the dialed number has been successful, and terminates the call (212). The subscription server 120 also stores at least one entry in the database 106 that associates the MSISDN of the telephone 112 with the messaging service corresponding to the dialed number (212). The dialed number of the call is extracted from the data of the call by the subscription server 120. The subscription server then instructs a SMS server 122 of the server 104 to generate and send a confirmation SMS text message to the number of the telephone 112. The SMS server 122 communicates with the SMS gateway 108 using HTTP to instruct the gateway to send the confirmation message to the telephone 112 (214). The subscription process then completes (250).

The SMS server 122 queries the database 106 on a regular scheduled basis, or when instructed by an operator, and SMS or MMS messages are compiled so they can be sent to the mobile telephone 112 according to or for the messaging services that have the number of the telephone 112 recorded as being subscribed for that service.

To unsubscribe from the messaging service, the subscriber of the telephone 112 simply needs to dial the number of that messaging service again so as to place a subsequent voice call on that number to the system 100. The subscription server 120 executes an unsubscribe process which is essentially the same as the subscription process 200, except that when the server 120 seeks to make the association between the MSISDN and the messaging service, if this association already exists, the MSISDN is flagged as being inactive for the service. For a third call to the messaging service number, similar processes again are performed by the subscription server 120 but the MSISDN is then flagged as active for the service. Accordingly, odd calls to the messaging service telephone number will lead to an active subscription whereas even calls will lead to an inactive subscription. Calls to the messaging service numbers will cause the service for the phone 112 to toggle between the active and inactive states.

The messaging service system 100 may be implemented using a variety of components. The PBX 102 may be provided by a computer server, such at that produced by IBM Corporation running Unix or Linux with the call handling component 114 provided by a computer program instruction code part written using a language such as Ruby (http://www.ruby-lang.org) and part provided by Asterisk (http://www.asterisk.org) which implements a telephone private branch exchange. The PBX 102 communicates and interacts with the subscription server 120 using the Asterisk Gateway Interface (AGI). The computer server 104 may be provided by a computer server produced by IBM Corporation, and include computer program instruction code written in Ruby to provide the subscription server 120 and the SMS server 122, with the web server 124 being provided using Ruby on Rails (http://www.rubyonrails.org). The database 106 may be implemented using MySQL (http://www.mysql.com). Other alternatives are available where, for example, the servers 120, 122, 124 are provided on separate machines and any code required is based on the .Net framework (http://msdn.microsoft.com/netframework). Also, the computer program instruction code can be replaced, at least in part, by hardware circuits (e.g. ASICs and FPGAs), particularly in the PBX 102, to improve processing speeds for those parts of the process that do not need to be regularly reconfigured.

Many modifications will be apparent to those skilled in the art without departing from the scope of the present invention as herein described with reference to the accompanying drawings.

The invention claimed is:

1. An automated process for subscription to a messaging service, including:
   accepting a voice call from a mobile communications device;
   extracting caller identification (ID) data received with the voice call;
   sending a subscription acceptance message to the device;
   associating the caller ID data with a messaging service identified by the called number of the call;
   accepting a second voice call on the called number from the communications device;
   sending an unsubscribed message to the device; and
   recording the caller ID data as being inactive for the messaging service identified by the called number.

2. A process as claimed in claim 1, wherein the acceptance message is played to the caller during the voice call.

3. A process as claimed in claim 1, wherein the caller ID data represents the telephone number of the mobile communications device.

4. A process as claimed in claim 1, wherein said associating includes storing the caller ID data with reference to service data representing the messaging service and flagging said caller ID data as being active for said service.

5. A process as claimed in claim 1, wherein said messaging service includes sending SMS messages to said device, said messaging including content associated with said subscription.

6. A process as claimed in claim 5, wherein said messages are at least one of SMS and MMS messages.

7. A process as claimed in claim 1, wherein accepting and extracting are performed by a private branch exchange and the called number is a telephone number supported by the private branch exchange.

8. A process as claimed in claim 1, wherein extracting comprises extracting only caller identification data received with the voice call and the called number to establish the call.

9. An automated process for subscription to a messaging service, including
- accepting a voice call from a communications device;
- determining if caller identification (ID) data can be extracted from the voice call;
- determining if the communications device is able to receive messages of a messaging service;
- sending a subscription acceptance message to the device;
- associating the caller ID data with a messaging service identified by the called number of the call;
- accepting a second voice call on the called number from the communications device;
- sending an unsubscribed message to the device; and
- recording the caller ID data as being inactive for the messaging service identified by the called number.

10. A process as claimed in claim 9, including sending a deny message to the device if the caller ID data cannot be extracted.

11. A process as claimed in claim 10, wherein the deny message is played to the caller during the voice call.

12. A process as claim in claim 9, including sending a deny message if the communications device is unable to receive messages of a messaging service.

13. A messaging service system, including:
- a call component for receiving a voice call from a caller and transmitting call data associated with the call, the call data including caller identification (ID) data; and
- a subscription server for receiving the call data, causing the call component to send a subscription acceptance message to the caller, and storing the caller ID data in association with data representing a messaging service identified by the called number of the call data, wherein said caller ID data is flagged as active for the service on said association, and flagged as inactive when the call component receives a second call to said called number.

14. A system as claimed in claim 13, wherein if the call data does not include caller ID data, the subscription server causes the call component to send a subscription deny message to the caller.

15. A system as claimed in claim 13, wherein if the call data indicates a device making the call is unable to receive messages associated with the messaging service, the subscription server causes the call component to send a subscription deny message to the caller.

16. A system as claimed in claim 13, including a media server for sending electronic messages to devices having caller IDs associated with the messaging service.

17. A system as claimed in claim 16, wherein said messages are at least one of SMS and MMS messages.

18. A system as claimed in claim 13, including a web server for publishing a plurality of telephone numbers for calling said call component and information on a plurality of messaging services associated with said numbers, respectively.

19. A system as claimed in claim 13, wherein the call component comprises a private branch exchange and the called number is a telephone number supported by the private branch exchange.

20. A system as claimed in claim 13, wherein the call data includes only caller identification data and the called number to establish the call.

* * * * *

UNITED STATES PATENT AND TRADEMARK OFFICE
CERTIFICATE OF CORRECTION

PATENT NO. : 8,401,531 B2  Page 1 of 1
APPLICATION NO. : 12/602853
DATED : March 19, 2013
INVENTOR(S) : Low et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 655 days.

Signed and Sealed this

First Day of September, 2015

Michelle K. Lee
*Director of the United States Patent and Trademark Office*